US010572532B2

(12) United States Patent
Eronen et al.

(10) Patent No.: US 10,572,532 B2
(45) Date of Patent: Feb. 25, 2020

(54) APPARATUS, METHOD AND COMPUTER PROGRAM PRODUCT FOR FILTERING MEDIA FILES

(71) Applicant: Conversant Wireless Licensing S.a r.l., Luxembourg (LU)

(72) Inventors: Antti Johannes Eronen, Tampere (FI); Jukka Holm, Tampere (FI); Arto Lehtiniemi, Lempaala (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 772 days.

(21) Appl. No.: 14/734,725

(22) Filed: Jun. 9, 2015

(65) Prior Publication Data

US 2015/0278228 A1    Oct. 1, 2015

Related U.S. Application Data

(63) Continuation of application No. 12/147,872, filed on Jun. 27, 2008, now abandoned.

(51) Int. Cl.
*G06F 16/44* (2019.01)
*G06F 16/9032* (2019.01)
*G06Q 30/00* (2012.01)
*G06Q 10/00* (2012.01)

(52) U.S. Cl.
CPC ........ *G06F 16/44* (2019.01); *G06F 16/90324* (2019.01); *G06Q 10/00* (2013.01); *G06Q 30/00* (2013.01)

(58) Field of Classification Search
CPC .. G06F 16/435; G06F 16/335; G06F 16/9535; G06F 16/635
See application file for complete search history.

(56) References Cited

U.S. PATENT DOCUMENTS

| 5,583,763 | A | 12/1996 | Atcheson et al. |
| 7,152,063 | B2 * | 12/2006 | Hoashi .............. G06F 17/30699 |
| 2001/0032204 | A1 * | 10/2001 | Hoashi ................... G06F 16/335 |
| 2003/0106058 | A1 | 6/2003 | Zimmerman et al. |
| 2003/0236770 | A1 * | 12/2003 | Kurapati ........... G06F 17/30867 |

(Continued)

FOREIGN PATENT DOCUMENTS

| CN | 1600022 A | 3/2005 |
| CN | 1708986 A | 12/2005 |

(Continued)

*Primary Examiner* — Cheyne D Ly
(74) *Attorney, Agent, or Firm* — Conversant Wireless Licensing

(57) ABSTRACT

An apparatus, method and computer program product are provided for filtering media files for inclusion in a user's profile. A user may define rules to prevent certain media files from being included in his/her profile and, if desired, to redirect the media files to another individual's profile. The recommendation service, itself, may further generate rules to be used to filter the media files. When a media file that meets one of the rules defined by the user, or automatically by the service, is consumed in association with the user's account, a reference associated with the media file may, depending upon the requirements of the rule, be placed into a temporary folder, from which the user may delete the reference or redirect it to his or her own, or another's, profile.

18 Claims, 5 Drawing Sheets

(56) References Cited

U.S. PATENT DOCUMENTS

| | | | |
|---|---|---|---|
| 2004/0030599 A1* | 2/2004 | Sie | G06Q 30/02 705/14.4 |
| 2004/0073918 A1* | 4/2004 | Ferman | H04H 60/46 725/34 |
| 2005/0251807 A1* | 11/2005 | Weel | H04L 67/10 719/310 |
| 2006/0100987 A1* | 5/2006 | Leurs | H04N 5/44543 |
| 2007/0067309 A1* | 3/2007 | Klein, Jr. | G06F 17/30017 |
| 2007/0168342 A1* | 7/2007 | Singerman | G06F 17/30867 |
| 2008/0097949 A1* | 4/2008 | Kelly | H04N 21/44204 706/52 |

FOREIGN PATENT DOCUMENTS

| | | |
|---|---|---|
| WO | 00/17792 | 3/2000 |
| WO | 2004/043069 A1 | 5/2004 |
| WO | 2008-027924 A2 | 3/2008 |

\* cited by examiner

APPARATUS, METHOD AND COMPUTER PROGRAM PRODUCT FOR FILTERING MEDIA FILES

This application is a continuation of U.S. patent application Ser. No. 12/147,872 filed Jun. 27, 2008, the disclosures of which are incorporated herein by reference in their entireties.

FIELD

Embodiments of the invention relate, generally, to media services and, in particular, to media services that learn a user's media consumption habits and provide personalized recommendations.

BACKGROUND

Several media services exist today that allow individuals to browse, sample, download and purchase various media files (e.g., individual songs, albums, movies and television shows) using their electronic devices (e.g., cellular telephones, personal digital assistants (PDAs), personal computers (PCs), laptops, etc.). Many of these services, which are often accessible via the Internet, may also provide recommendations services, whereby the service may monitor the user's activity and provide recommendations of media files that may be of interest to the user based on the user's apparent preferences. In particular, many of these services utilize a user account, including for example a username/user ID and password, to identify each user. When a user completes a transaction within or using the service, such as buying a music track or movie, the service may build a personal profile of the user. Based on the profile, the service may learn to provide personalized recommendations to the user. For example, the service may recommend media items or files (e.g., songs, albums, movies, television show episodes or series, etc.) that are similar to the items or files previously accessed, downloaded, purchased, or otherwise consumed, by the user.

One issue may arise, however, if someone other than the user downloads, or otherwise accesses, a media file or item while accessing the recommendation service under the user's account, which may contaminate the personalized recommendations. A need exists for an improved recommendation system that may overcome this and other challenges.

BRIEF SUMMARY

In general, embodiments of the present invention may provide an improvement by, among other things, providing a recommendation system that enables a user to filter the media files included in his or her profile and, therefore, used to generate media file recommendations. In particular, according to embodiments of the present invention, a user may define one or more rules that may be used to help ensure that media files consumed by someone other than the user while accessing the service using the user's account (e.g., someone logged onto the service using the user's user ID and password) are not included in the user's profile. For example, if a user knows that his or her brother often downloads horror movies while accessing the service using the user's account, but the user him- or herself does not enjoy horror movies, the user may define a rule that states that all horror movies consumed while the user is logged onto the service should be included in the brother's profile, and not the user's.

According to one embodiment, the recommendation service itself may automatically generate a rule that can also be used to filter media files to be included in the user's profile. For example, if the recommendation service recommends a particular media file (e.g., the song "Miami" by Will Smith), and the user indicates that he or she does not care for that particular recommendation, the recommendation service may generate a rule that states that any similar media files (e.g., any east coast hip hop songs) consumed under the user's account should be included, not in the user's profile, but instead in a temporary folder, which the user may periodically access and decide whether to accept or decline the media files included therein.

In yet another embodiment, the recommendation service may simply look to see if the media file consumed resembles the media files previously consumed by the user and included in his or her personal profile. If not, the recommendation service may similarly include the media file in a temporary folder, rather than the user's profile, so that the user may be given the opportunity to indicate whether it was, in fact, him or her who consumed the media file and, therefore, that the media file should be included in the user's profile.

According to another embodiment, the "recommendation service" may be provided by the user's device itself, for example, in the form of music files selected to play when the user has placed the device in "shuffle" mode. According to this embodiment, the user may define his or her own rules (e.g., in the manner described above) and/or the user's device may automatically generate its own rules e.g., based on the user's consumption habits). When the user instructs his or her device to randomly select music files from his or her saved collection (e.g., when the user places the device in "shuffle" mode), the device may select (or not select) music files based on the various rules defined and/or generated. In addition to music files, other types of media files may likewise be used in accordance with this embodiment including, for example, video files, podcasts, game files, and/or the like.

According to one aspect, an apparatus for filtering media files may be provided. In one embodiment, the apparatus may comprise a processor configured to: (1) receive information identifying a media file consumed; (2) determine whether a reference to the media file should be included in a profile associated with a user, wherein the profile is usable to generate a recommendation of another media file for the user; and (3) include the reference to the media file in the user's profile if it is determined that the reference should be included.

According to another aspect, a method of filtering media files may be provided. In one embodiment, the method may comprise: (1) receiving information identifying a media file consumed; (2) determining whether a reference to the media file should be included in a profile associated with a user, wherein the profile is usable to generate a recommendation of another media file for the user; and (3) including the reference to the media file in the user's profile if it is determined that the reference should be included.

In accordance with yet another aspect, a computer program product for filtering media files may be provided. In one embodiment, the computer program product may comprise at least one computer-readable storage medium having computer-readable program code portions store therein, wherein the computer-readable program code portions may comprise: (1) a first executable portion for receiving information identifying a media file consumed; (2) a second executable portion for determining whether a reference to the media file should be included in a profile associated with a user, wherein the profile is usable to generate a recommendation of another media file for the user; and (3) a third executable portion for including the reference to the media file in the user's profile if it is determined that the reference should be included.

According to one aspect, an apparatus may be provided for filtering media files. In one embodiment, the apparatus may comprise: (1) means for receiving information identifying a media file consumed; (2) means for determining whether a reference to the media file should be included in a profile associated with a user, wherein the profile is usable to generate a recommendation of another media file for the user; and (3) means for including the reference to the media file in the user's profile if it is determined that the reference should be included.

The above summary is provided merely for purposes of summarizing some example embodiments of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
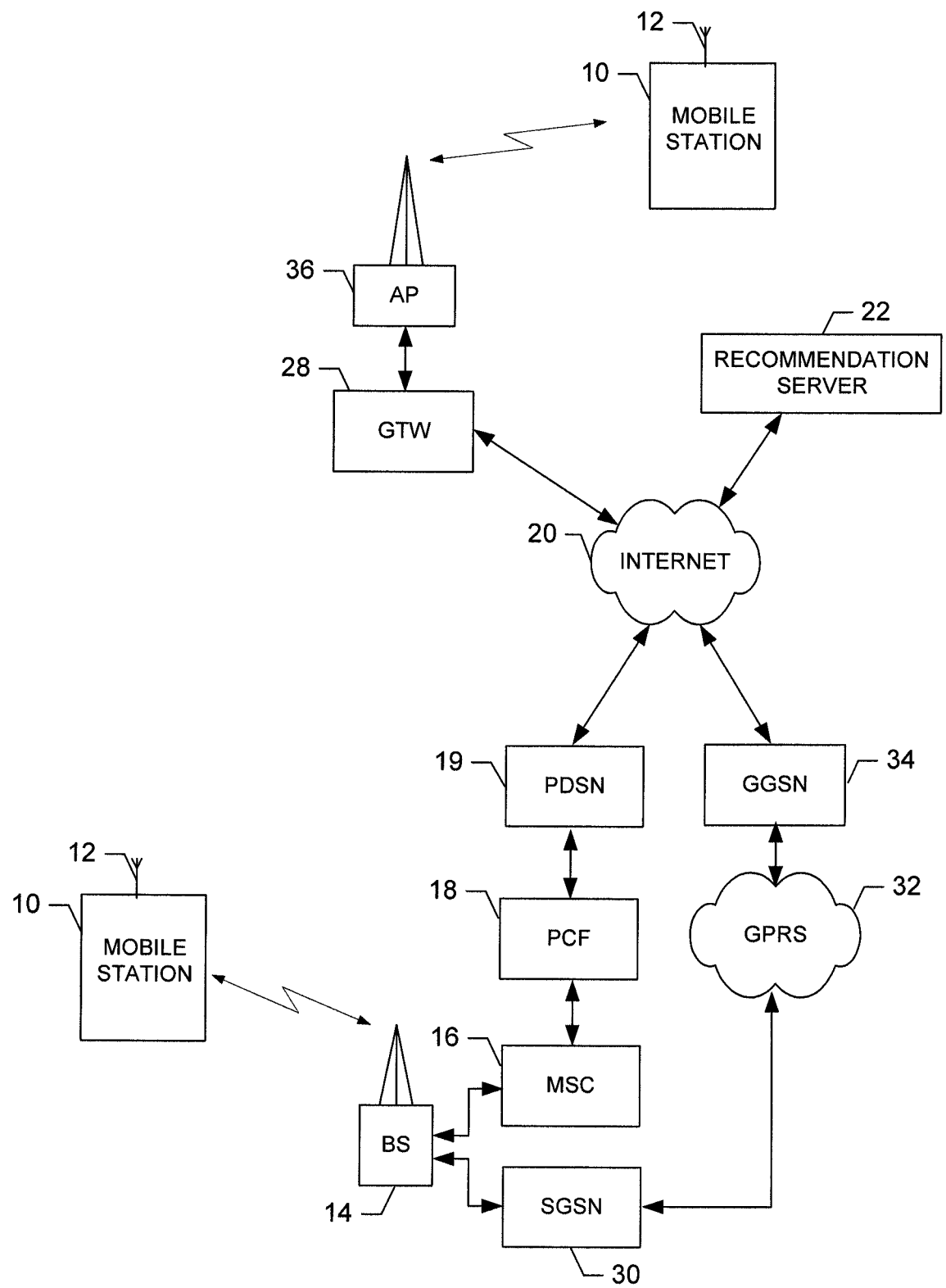
FIG. 1 is a block diagram of one type of system that may benefit from embodiments the present invention.

Embodiments of the present invention will now be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview:

In general, embodiments of the present invention provide an apparatus, method and computer program product for filtering media files to be included in a user's profile and, therefore, used to generate recommendations of media files in which the user may be interested. In particular according to various embodiments of the present invention a user may define one or more rules to prevent certain media files, or types of media files, from being included in his or her personal media profile and, if desired, to redirect the media files to another individual's personal profile. For example, a user may desire to redirect all French chansons to his girlfriend's profile, since he personally does not care for French music and knows that his girlfriend frequently accesses the recommendation service under his account name and downloads French chansons. In addition, according to one embodiment, the recommendation service, itself, may generate one or more rules to be used to filter media files to be included in the user's profile. These rules may be based, for example, on the user's ranking or rating of previous recommendations made by the service and/or of a user's decision to accept or decline media files referenced in a temporary file associated with the user.

According to one embodiment, when the service notices that the user is consuming a media file that meets one of the rules defined by the user, or automatically by the service, a reference associated with the media file (e.g., information identifying the media file and/or the media consumption event) may, depending upon the requirements of the rule, be placed into or included in a temporary folder, from which the user may either delete the reference or redirect it to his or her own, or another's, personal profile. The user may periodically view the contents of the temporary folder and accept the media files that he or she prefers. In other words, the user may indicate that the preferred media files should be included in the user's profile. Media files not accepted may, after some period of time, be automatically deleted from the temporary file.

In one embodiment, the recommendation system may also automatically attempt to verify the quality of the media files referenced in the temporary folder. For example, the recommendation system may recommend a media file based at least in part on the contents of the temporary folder, and, if the user likes the recommendation, the service may determine that the user does in fact like media files of the kind referenced in the temporary folder and include a reference to those media files in the user's profile. In the future, similar media files may be directly forwarded to the user's profile (e.g., rather than first going to the temporary folder).

In addition, according to another embodiment, one or more rules may be defined by a user and/or automatically generated by the user's device, wherein the rules may be used, for example, to select music tracks, or other media files, to output when the device is in "shuffle" mode. For example, according to one embodiment, the user's device may monitor the user's consumption habits (e.g., what music files he or she outputs, repeats, skips, etc.) in order to attempt to identify which media files the current user likes or dislikes. The user's device may thereafter use this information (e.g., the rules generated based at least in part on this information) to select (or not select) media files (e.g., music tracks or files) when the user instructs the user's device to randomly select media files to output (e.g., places the user's device in "shuffle" mode).

Overall System, Recommendation Server and Mobile Device:

Referring to FIG. 1, an illustration of one type of system that may benefit from embodiments of the present invention is provided. As shown in FIG. 1, the system may include one or more mobile terminals 10, each having an antenna 12 for transmitting signals to and for receiving signals from one or more base stations (BS's) 14. The base station may be a part of one or more cellular or mobile networks that each includes elements that may be desirable for operating the network, such as one or more mobile switching centers (MSC) 16. In operation, the MSC may be capable of routing calls, data or the like to and from mobile terminals when those mobile terminals are making and receiving calls, data or the like. The MSC may also provide a connection to landline trunks when mobile terminals are involved in a call.

The MSC 16 may be coupled to a data network, such as a local area network (LAN), a metropolitan area network (MAN), and/or a wide area network (WAN). The MSC may be directly coupled to the data network. In one embodiment, however, the MSC may be coupled to a Packet Control Function (PCF) 18, and the PCF may be coupled to a Packet Data Serving Node (PDSN) 19, which may in turn be coupled to a WAN, such as the Internet 20. In turn, devices such as processing elements (e.g., personal computers, server computers or the like) may be coupled to the mobile terminal 10 via the Internet. For example, the processing elements may include a recommendation server 22, or similar network entity, discussed below. As will be appreciated, the processing elements may comprise any of a number of processing devices, systems or the like capable of operating in accordance with embodiments of the present invention.

The BS 14 may also be coupled to a signaling GPRS (General Packet Radio Service) support node (SGSN) 30. As known to those skilled in the art, the SGSN may be capable of performing functions similar to the MSC 16 for packet switched services. The SGSN, like the MSC, may be coupled to a data network, such as the Internet 20. The SGSN may be directly coupled to the data network. Alternatively, the SGSN may be coupled to a packet-switched core network, such as a GPRS core network 32. The packet-switched core network may then be coupled to another GTW (gateway), such as a GM GPRS support node (GGSN) 34, and the GGSN may be coupled to the Internet.

Although not every element of every possible network is shown and described herein, it should be appreciated that the mobile terminal 10 may be coupled to one or more of any of a number of different networks. In this regard, mobile network(s) may be capable of supporting communication in accordance with any one or more of a number of first-generation (1G), second-generation (2G), 2.5G and/or third-generation (3G) mobile communication protocols or the like. For example, one or more mobile terminals may be coupled to one or more networks capable of supporting communication in accordance with 2G wireless communication protocols IS-136 (time division multiple access (TDMA)), global system for mobile communications (GSM), and IS-95 (code division multiple access (CDMA)). Also, for example, one or more of the network(s) may be capable of supporting communication in accordance with 2.5G wireless communication protocols GPRS, Enhanced Data GSM Environment (SEDGE), or the like. In addition, for example, one or more of the network(s) may be capable of supporting communication in accordance with 3G wireless communication protocols such as Universal Mobile Telephone System (UMTS) network employing Wideband Code Division Multiple Access (WCDMA) radio access technology. Some narrow-band Advanced Mobile Phone System (NAMPS), as well as Total Access Communication System (TACS), network(s) may also benefit from embodiments of the present invention, as should dual or higher mode mobile terminals (e.g., digital/analog or TDMA/CDMA/analog phones).

One or more mobile terminals 10 (as well as one or more processing elements, although not shown as such in FIG. 1) may further be coupled to one or more wireless access points (APs) 36. The AP's may be configured to communicate with the mobile terminal in accordance with techniques such as, for example, radio frequency (RE), Bluetooth (BT), infrared (IrDA) or any of a number of different wireless networking techniques, including Wireless LAN (WLAN) techniques, such as IEEE 802.11 (e.g., 802.11a, 802.11b, 802.11g, 802.11n, etc.), Wibree™ techniques, WiMAX techniques, such as IEEE 802.16, Wireless-Fidelity (Wi-Fi) techniques, and/or ultra wideband (UWB) techniques, such as 802.15, or the like. The APs may be coupled to the Internet 20. Like with the MSC 16, the AP's may be directly coupled to the Internet. In one embodiment, however, the AP's may be indirectly coupled to the Internet via a GTW 28. As will be appreciated, by directly or indirectly connecting the mobile terminals and the processing elements (e.g., recommendation server 22) and/or any of a number of other devices to the Internet, whether via the AP's or the mobile network(s), the mobile terminals and processing elements may communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored. Thus, use of any such terms should not be taken to limit the spirit and scope of the present invention.

Although not shown in FIG. 1, in addition to or in lieu of coupling the mobile terminals 10 to one or more processing elements (e.g., a network entity associated with a Recommendation Service 22) across the Internet 20, one or more such entities may be directly coupled to one another. As such, one or more network entities may communicate with one another in accordance with, for example, RF, BT, IrDA or any of a number of different wireline or wireless communication techniques, including LAN, WLAN, WiMAX, Wi-Fi, Wibree™, UWB techniques, and/or the like. Further, the mobile terminal 10 and the processing elements may be coupled to one or more electronic devices, such as printers, digital projectors and/or other multimedia capturing, producing and/or storing devices (e.g., other terminals).

Figure 2:
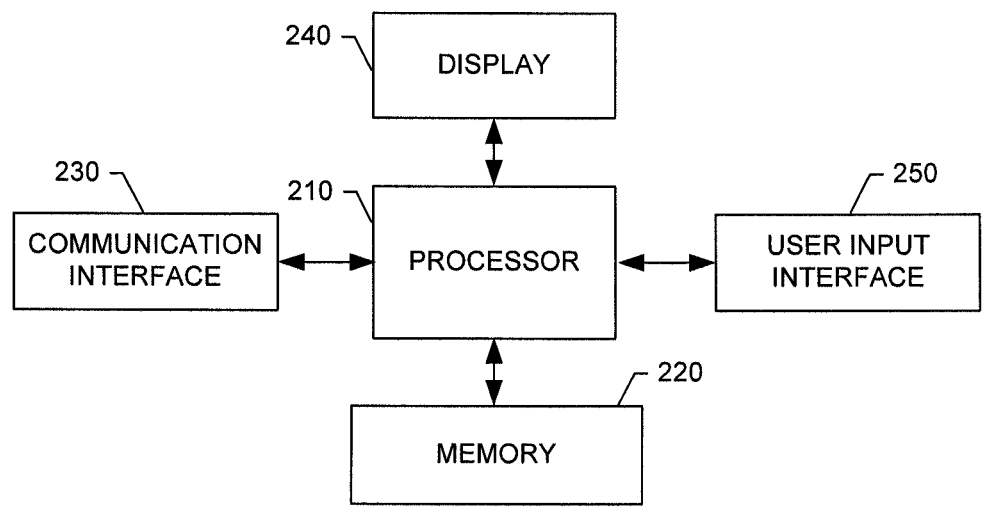
FIG. 2 is a schematic block diagram of an entity capable of operating as a recommendation server in accordance with embodiments of the present invention.

Referring now to FIG. 2, a block diagram of an entity capable of operating as a recommendation server 22 is shown in accordance with one embodiment of the present invention. The entity capable of operating as a recommendation server 22 may include various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as a recommendation server 22 may generally include means, such as a processor 210, for performing or controlling the various functions of the entity.

In particular, the processor 210 may be configured to perform the processes discussed in more detail below with regard to FIGS. 4A and 4B. For example, according to one embodiment the processor 210 may be configured to receive information identifying a media file consumed (e.g., accessed, downloaded, purchased, etc. via an electronic device associated with a user), to determine whether reference to the media file should be included in a profile associated with a user (e.g., based at least in part on one or more rules defined by the user or automatically generated by the recommendation server 22), and to include the reference to the media file in the profile if it is determined that the reference should be included.

In one embodiment, the processor is in communication with or includes memory 220, such as volatile and/or non-volatile memory that stores content, data or the like. For example, the memory 220 may store content transmitted from, and/or received by, the entity. Also for example, the memory 220 may store software applications, instructions OF the like for the processor to perform steps associated with operation of the entity in accordance with embodiments of the present invention. In particular, the memory 220 may store software applications, instructions or the like for the processor to perform the operations described above and below with regard to FIGS. 4A and 4B for filtering the media files to be included in a user's profile.

For example, according to one embodiment, the memory 120 may store one or more modules for instructing the processor 210 to perform the operations including, for example, an identification module, a determining module, and an inclusion module. In one embodiment, the identification module may be configured to receive information identifying a media file consumed, for example via an electronic device (e.g., mobile terminal 10) associated with a user. The determining module may be configured to determine whether a reference to the media file should be included in a profile associated with the user, and the inclusion module may be configured to include the reference in the user's profile if it is determined that the media file should be included.

In addition to the memory 220, the processor 210 may also be connected to at least one interface or other means for displaying, transmitting and/or receiving data, content or the like. In this regard, the interface(s) may include at least one communication interface 230 or other means for transmitting and/or receiving data, content or the like, as well as at least one user interface that may include a display 240 and/or a user input interface 250. The user input interface, in turn, may comprise any of a number of devices allowing the entity to receive data from a user, such as a keypad, a touch display, a joystick or other input device.

While the foregoing refers to a recommendation "server," as one of ordinary skill in the art will recognize in light of this disclosure, the functionality described above as being performed by the recommendation server 22 may be implemented on any type of computing device and could operate in computer architectures other than client/server systems. In addition, while reference is made to software "modules," as one of ordinary skill in the art will recognize in light of this disclosure, the software need not be modularized and, instead, may be intermingled or written in other non-modular formats without departing from the spirit and scope of embodiments of the present invention.

Figure 3:
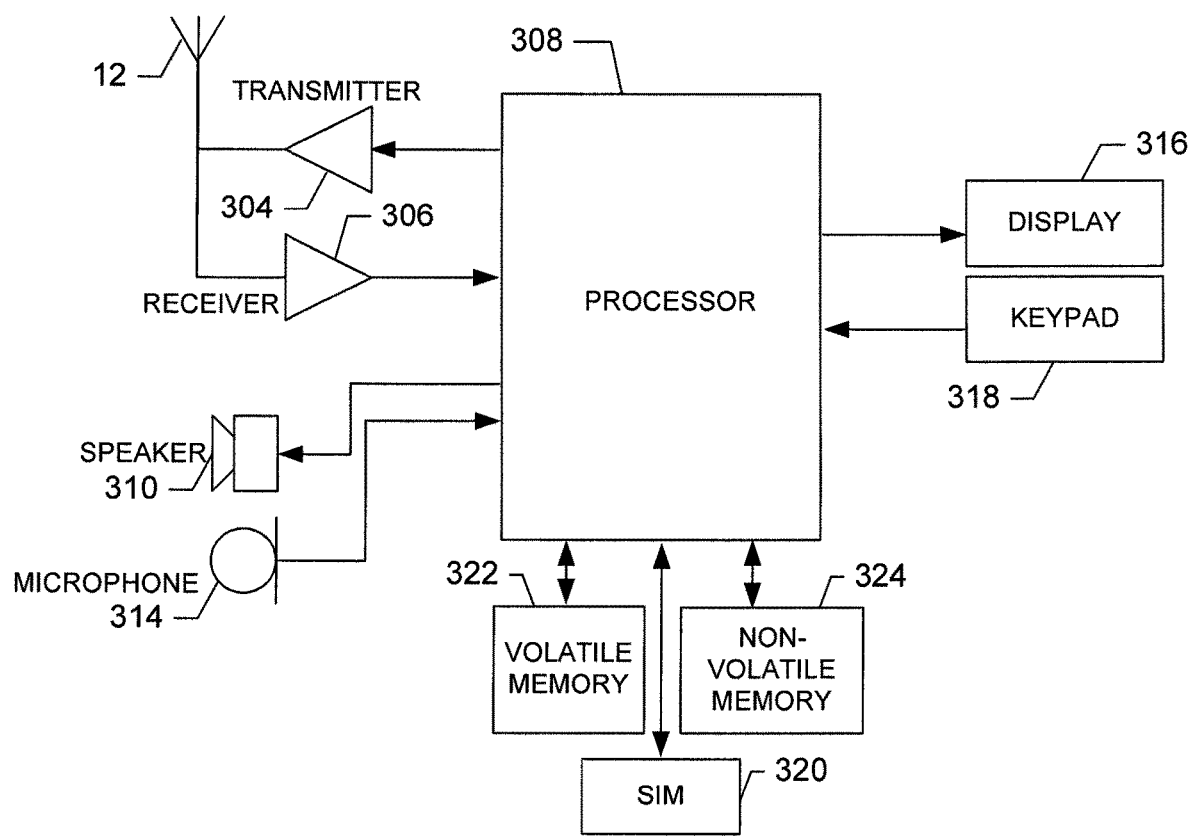
FIG. 3 is a schematic block diagram of a mobile terminal capable of operating in accordance with an embodiment of the present invention.

Reference is now made to FIG. 3, which illustrates one type of electronic device that would benefit from embodiments of the present invention. As shown, the electronic device may be a mobile terminal 10, and, in particular, a cellular telephone. It should be understood, however, that the mobile terminal illustrated and hereinafter described is merely illustrative of one type of electronic device that would benefit from embodiments of the present invention and, therefore, should not be taken to limit the scope of the present invention. While several embodiments of the mobile terminal 10 are illustrated and will be hereinafter described for purposes of example, other types of mobile terminals, such as personal digital assistants (PDAs), mobile computers, pagers, mobile televisions, gaming devices, laptop computers, cameras, video recorders, as well as other types of electronic systems including both mobile, wireless devices and fixed, wireline devices, may also employ embodiments of the present invention.

The mobile terminal includes various means for performing one or more functions in accordance with embodiments of the present invention, including those more particularly shown and described herein. It should be understood, however, that the mobile terminal may include alternative means for performing one or more like functions, without departing from the spirit and scope of the present invention. More particularly, for example, as shown in FIG. 3, in addition to an antenna 12, the mobile terminal 10 may include a transmitter 304, a receiver 306, and an apparatus that includes means, such as a processor 308, controller or the like, that provides signals to and receives signals from the transmitter 304 and receiver 306, respectively, and that performs the various other functions described below including, for example, the functions relating to filtering media files to be included in a user's profile.

As discussed in more detail below with regard to FIGS. 4A and 4B, in one embodiment, the processor 308 may be configured to receive a definition of a rule for filtering one or more media files for inclusion in a profile associated with a user and to transmit the definition of the rule (e.g., to the recommendation server 22). The processor 308 may further be configured to transmit information identifying a media file consumed via the mobile terminal 12, wherein the media file may be compared (e.g., by the recommendation server 22) to the defined rule in order to determine whether the consumed media file should be included in the user's profile.

The signals provided to and received from the transmitter 304 and receiver 306, respectively, may include signaling information in accordance with the air interface standard of the applicable cellular system and also user speech and/or user generated data. In this regard, the mobile terminal may be capable of operating with one or more air interface standards, communication protocols, modulation types, and access types. More particularly, the mobile terminal may be capable of operating in accordance with any of a number of second-generation (2G), 2.5G and/or third-generation (3G) communication protocols or the like. Further, for example, the mobile terminal may be capable of operating in accordance with any of a number of different wireless networking techniques, including Bluetooth, IEEE 802.11 WLAN (or Wi-Fi®), IEEE 802.16 WiMAX ultra wideband (UWB), and/or the like.

It is understood that the processor 308, controller or other computing device, may include the circuitry which may be used to implement the video, audio, and logic functions of the mobile terminal and may be capable of executing application programs for implementing the functionality discussed herein. For example, the processor may be comprised of various means including a digital signal processor device, a microprocessor device, and various analog to digital converters, digital to analog converters, and other support circuits. The control and signal processing functions of the mobile device may be allocated between these devices according to their respective capabilities. The processor 308 thus may also include the functionality to convolutionally encode and interleave message and data prior to modulation and transmission. Further, the processor 308 may include the functionality to operate one or more software applications, which may be stored in memory. For example, the controller may be capable of operating a connectivity program, such as a conventional Web browser and/or the like. The connectivity program may then allow the mobile terminal to transmit and receive Web content, such as according to HTTP, Hypertext Transfer Protocol over Secure Socket Layer (HTTPS), the Wireless Application Protocol (WAP), and/or the like, for example.

The mobile terminal may also comprise means such as a user interface including, for example, a conventional earphone or speaker 310, a ringer 312, a microphone 314, a display 316, all of which are coupled to the processor 308. The user input interface, which allows the mobile device to receive data, may comprise devices allowing the mobile device to receive data, such as a keypad 318, a touch display (not shown), a microphone 314, or other input device. In embodiments including a keypad, the keypad may comprise the numeric (0-9) and related keys (#, *), and other keys used for operating the mobile terminal and may include a full set of alphanumeric keys or set of keys that may be activated to provide a full set of alphanumeric keys. Although not shown, the mobile terminal may comprise a battery, such as a vibrating battery pack, for powering the various circuits that may be used to operate the mobile terminal, as well as optionally providing mechanical vibration as a detectable output.

The mobile terminal may also include means, such as memory including, for example, a subscriber identity module (SIM) 320, a removable user identity module (R-UIM) (not shown), or the like, which may store information elements related to a mobile subscriber. In addition to the SIM, the mobile terminal may include other memory. In this regard, the mobile terminal may include volatile memory 322, as well as other non-volatile memory 324, which may be embedded and/or may be removable. For example, the other non-volatile memory may be embedded or removable multimedia memory cards (MMCs), secure digital (SD) memory cards, Memory Sticks, electrically erasable programmable read-only memory (EEPROM), flash memory, hard disk, or the like. The memory may store any of a number of pieces or amount of information and data used by the mobile device to implement the functions of the mobile terminal. For example, the memory may store an identifier, such as an international mobile equipment identity (IMEI) code, international mobile subscriber identity (IMSI) code, mobile device integrated services digital network (MSISDN) number, or the like, capable of uniquely identifying the mobile device. The memory may also store content. The memory may, for example, store computer program code for an application and other computer programs. For example, in one embodiment of the present invention, the memory may store computer program code for filtering media files for inclusion in a user's profile. In particular, according to one embodiment, the memory may store a rule module configured to receive a definition of a rule for filtering one or more media files for inclusion in a profile associated with a user and to transmit the definition of the rule (e.g., to the recommendation server 22). The memory may further store an identification module configured to transmit information identifying a media file consumed via the mobile terminal 12, wherein the media file may be compared (e.g., by the recommendation server 22) to the defined rule in order to determine whether the consumed media file should be included in the user's profile.

The apparatus, method and computer program product of embodiments of the present invention are primarily described in conjunction with mobile communications applications. It should be understood; however, that the apparatus, method and computer program product of embodiments of the present invention may be utilized in conjunction with a variety of other applications, both in the mobile communications industries and outside of the mobile communications industries. For example, the apparatus, method and computer program product of embodiments of the present invention may be utilized in conjunction with wireline and/or wireless network (e.g.; Internet) applications.

Method of Filtering Media Files

Figure 4A:
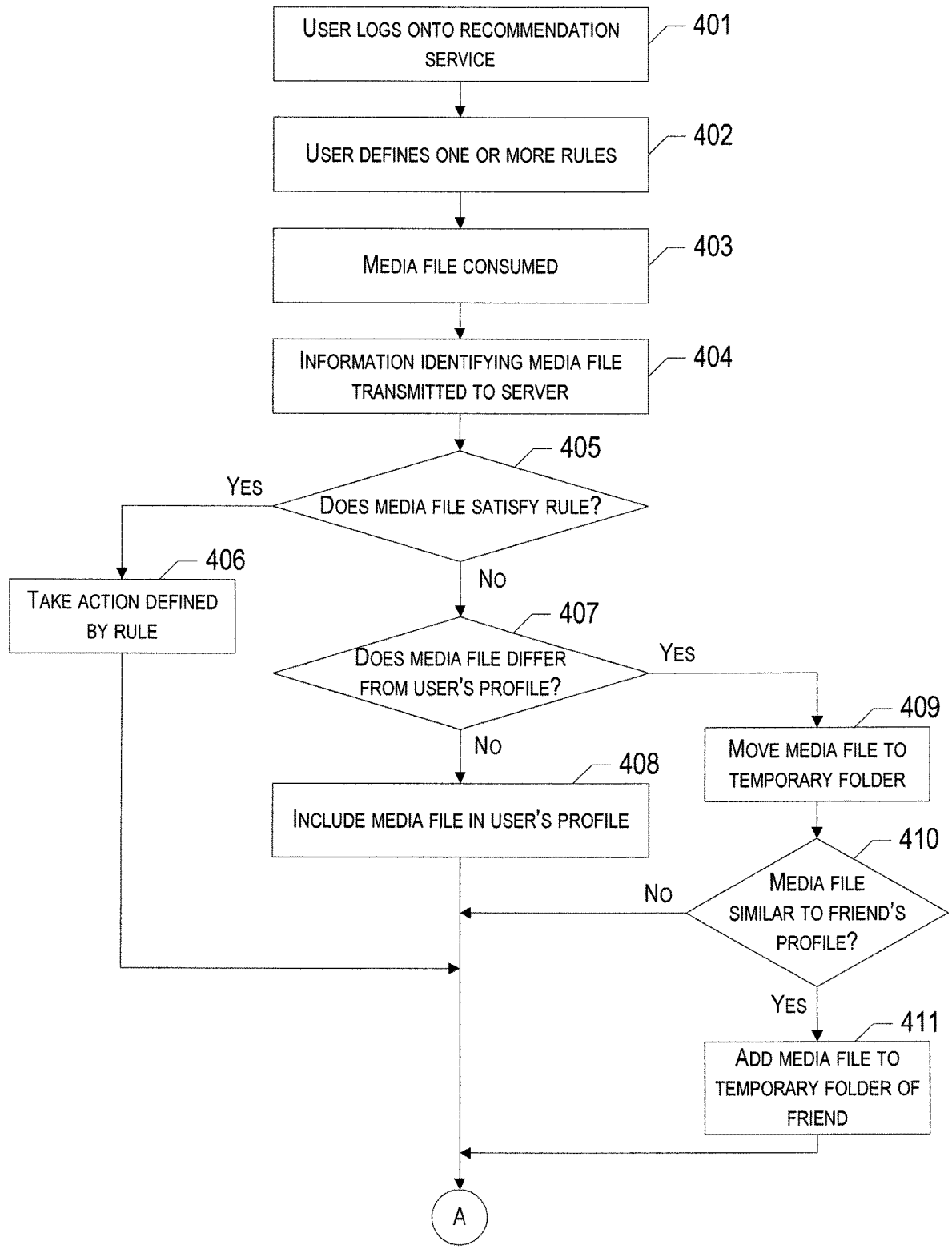
FIGS. 4A and 4B are flow charts illustrating the process of filtering media files in accordance with embodiments of the present invention.
Figure 4B:
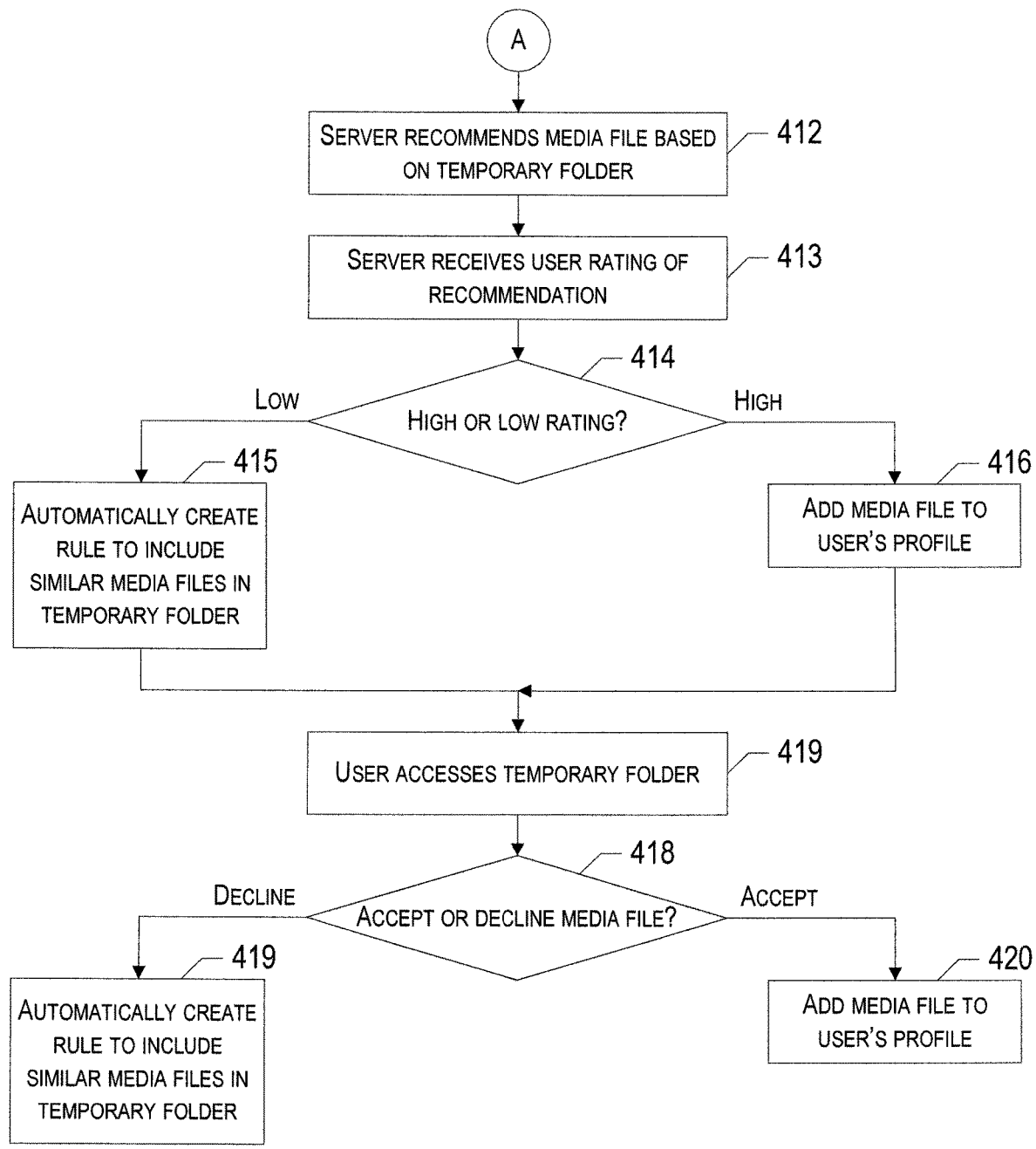

Referring now to FIGS. 4A and 4B, the operations are illustrated that may be taken in order to filter media files to be included in a user's profile and, therefore, used to generate recommendations of media files that may be of interest to the user. As shown, the process may begin at Block 401 when a user logs onto a recommendation service (e.g., associated with and/or provided by the recommendation server 22) using, for example, his or her username/user ID and password. As discussed above, the recommendation service may provide a catalogue of media files (e.g., songs, movies; television shows, games; etc.) from which a user may select for downloading, purchasing, or otherwise consuming. In one embodiment, in order to access the recommendation service, a client application running on the user's electronic device (e.g., cellular telephone, personal digital assistant (PDA), personal computer (PC), laptop, etc.) may call (e.g., over Hypertext Transfer Protocol (HTTP)) a dedicated application program interface (API) provided by the recommendation service running on the recommendation server 22. The user may interact with the client application to take actions, such as requesting media file streaming from the recommendation service, and/or the like, and the client application may then perform the necessary communication with the recommendation service. Alternatively, in another embodiment, the user may access the recommendation service by using his or her device's web browser to access a web site associated with the recommendation service (and operated by the recommendation server 22).

In addition to providing a catalogue of media files, according to embodiments of the present invention, the recommendation service may further provide recommendations to the user of media files he or she might enjoy. In order to provide these recommendations, according to one embodiment, the recommendation server 22 and, in particular, means, such as a processor and, in one embodiment, a profile module stored in memory on the recommendation server 22, may create a user profile including an indication of all of the media files the user has previously downloaded, purchased, accessed, or otherwise consumed. Media files identified in the user's profile may be analyzed in order to identify one or more preferences of the user. For example, if the majority of music files stored in the user's device fall within the genre Reggae, an analysis of the media files identified in the user's profile may indicate that the user prefers Reggae music. Preferences may be in terms of any number of different parameters associated with the media files including, for example, genre, artist, actor, producer, director, and/or the like. The identified preferences may thereafter be used to make recommendations of media files to the user. Continuing with the above example, the recommendation service may recommend a Reggae song, for example, by an artist the user has not previously listened to, or a new Reggae song the user has not listened to by a familiar artist.

Alternatively, or in addition, according to one embodiment, the recommendation server 22 may utilize the various forms of collaborative filtering (CF) methods to provide recommendations of media files to the user. The idea of CF-based algorithms is to provide item recommendations or predictions based on the opinions of other like-minded users. The opinions of users may be obtained explicitly from the users (e.g., a user may indicate that he or she likes a movie) or by using some implicit measures (e.g., if a user has listened a music track). For example, in one case, there are m users and n items. Each user may have expressed his or her opinion on some or all of the items. An opinion may be given explicitly as a rating score on a numerical scale, or it may be implicitly derived, for example, based on access logs (e.g. based on the number of times an item has been viewed or listened to). CF algorithms may represent the m-by-n user-item data as a rating matrix, wherein each entry in the rating matrix may represent the preference score of a user to an item. A value of 0 may indicate that a user has not yet rated an item. Various forms of CF-based methods may then be used to generate a list of items as recommendations to a user (the target user or active user).

Memory-based CF algorithms may utilize entire user-item data to create the recommendations. These methods may find a set of users called neighbors that have a similar profile (e.g., they tend to buy/listen to similar items) as the target user. The similarity between users u and v may be measured, for example, as the cosine of the angle between vectors consisting of the ratings of users u and v for different media items in the database. Items may then be recommended, for example, from the items found in the profiles of the neighbor users which the target user has not yet purchased. For example, the recommendation server may then provide a message to the user indicating "users who bought U2 also bought this album by R.E.M." Model-based CF algorithms may first develop a model of user ratings, for example by clustering users in groups, and use this information to create predictions on items.

Yet another method is the item-based CF approach which looks into the set of items the target user has rated, computes how similar they are to the target items (i.e., items in the database not yet accessed by the target user) and then selects k most similar items. Similarity between items i and j may be computed, for example, as the cosine of the angle between the vectors consisting of the ratings by different users for the items i and j.

In one embodiment, as part of the user's account, the user may further designate one or more other individuals as "friends" of the user, wherein recommendations may be shared amongst friends. Other individuals may also be designated as friends of the user by the recommendation service. For example, the recommendation service may suggest, or assign, certain users to be "friends" based at least in part on their consumption habits or other information, such as location, preferences, and/or the like. In particular, the recommendation server, and in particular means, such as a processor, and, in one embodiment, a recommendation module stored in memory on the recommendation server, may provide a recommendation to the user based at least in part on a media file consumed by one of the user's "friends." For example, the recommendation server may provide a message to the user stating—"Your friend Jyri just purchased 'I Know It's Gonna Happen Someday' by Morrissey, and we thought you might enjoy it too." As another example, the recommendation server may provide a message to the user stating—"Eini listened to 'My Life is an Endless Succession of People Saying Goodbye' by Morrissey. Would you like to be friends with Eini?"

As noted above, one problem associated with many recommendation services is that a party other than the user may consume (e.g., access, download, purchase, etc) a media file (e.g., song, movie, television show) while logged onto the system under the user's account. This may occur, for example, when members of a family (e.g., husband and wife) use the same device to download music, while not paying attention to whose account is being used. One result of multiple parties consuming media files under the same account is that the recommendations provided by the recommendation service may not be as accurate or appropriate for the user, particularly where different parties consuming media files have different tastes than the user. In order to attempt to resolve at least this problem, according to embodiments of the present invention, the user may, at Block 402, define one or more rules for filtering media files consumed for inclusion in the user's profile. In particular, according to one embodiment, in order to define the rule, the user may, for example, input a definition of the rule (e.g., the value/parameter and action, discussed below) to his or her electronic device, wherein the electronic device and, for example, means, such as a processor and, in one embodiment, the rule module, may receive the definition and transmit the definition of the rule to the recommendation server.

According to one embodiment, the rule may include at least two parts: (1) a value of a parameter associated with a media file; and (2) an action to be taken if the value of the parameter associated with a particular media file is substantially the same as the value defined by the rule. According to one embodiment, the parameters may include, for example, the genre, artist, album, actor, producer and/or director associated with a media file, and/or the like. The corresponding actions may include, for example, to delete reference to the media file from the user's account altogether; to include a reference to the media file in a temporary folder associated with the user, but not the user's profile; and/or to include a reference to the media file in a temporary folder associated with another party, just to name a few.

To illustrate, one example of a rule may require that all movies starring Tom Cruise be transferred to a temporary folder associated with the user's friend Joe (e.g., include a reference of all movies starring Tom Cruise in the temporary folder associated with Joe). In this example, the parameter may be "actor," the value "Tom Cruise," and the action "include a reference to the media file in a temporary folder associated with Joe." A user may generate this rule if it is anticipated that his friend Joe will download, or otherwise consume, Tom Cruise movies while accessing the recommendation service under the user's account. Similarly, another rule may require that reference to all science fiction television shows be deleted from the user's profile altogether. This rule may be generated by a user whose husband frequently downloads science fiction shows under his wife's account. In one embodiment, a user may be able to define rules for different media types at the same time. For example, the user may define a rule that requires that all romantic and French music, romantic movies and women's games be redirected to the user's wife's profile.

According to one embodiment, a time frame may be associated with the defined rules. For example, the user may indicate that a rule should last indefinitely, wherein the rule may be used unless and until the user deletes or modifies it. Alternatively, the user may indicate that the rule should expire some defined period of time (e.g., 10 days, 10 hours, etc) after creation. As another example, the user may define a temporary rule that may, for example, relate to a certain listening situation. For example, two users (e.g., boyfriend and girlfriend) may be listening to music together using the same device and, therefore, both logged in under the same user (e.g., the girlfriend). The party logged onto the service (e.g., the girlfriend) may define a temporary rule indicating that all music listened to during the session should be included in the profiles of both the boyfriend and the girlfriend.

At some point thereafter, whether part of the same session or another session, a media file may be consumed (e.g., accessed, downloaded, purchased, etc.) by a party accessing the recommendation service (or some other service configured to provide media files) using the user's account. As discussed above, this may or may not be the user him- or herself. In fact, since, as noted above, according to one embodiment, the recommendation service may be accessible via a website using a web browser application, the party consuming the media file via the user's account may or may not be doing so via a device associated with the user.

According to one embodiment, information identifying the media file consumed may be transmitted to and received by the recommendation server, and, in particular, means such as a processor and, in one embodiment, the identification module. (Block 404). The identifying information may include, for example, a title, artist name, album or series title, and/or the like, According to one embodiment, the recommendation server may be configured to use the identifying information received to retrieve additional information associated with the media file (e.g., genre, actor, director, producer, etc.) that may be needed, for example, to determine whether the media file satisfies one of the user's rules. In another embodiment, all necessary identifying information needed to determine whether the media file satisfies one of the user's rules may be included in the identifying information transmitted at Block 404.

In one embodiment, not shown, the user's device, and, in particular, means such as a processor operating on the user's device, may further transmit context information associated with the user's device to the recommendation server. For example, the user's device may transmit time and location information associated with the user's device, as well as Bluetooth® proximity information. This and other information may be used to indicate whether the user is alone or surrounded by other people, which may be helpful to the recommendation server in determining whether it was the user, or some other party, that consumed the media file.

According to another embodiment, the user's device may further attempt to discover which of one or more individuals may be using the device and then provide this information to the recommendation server. For example, the user's device may identify which other applications are currently being executed by the user's device and either provide this information to the recommendation server, for the recommendation service to use in attempting to identify the current user, or may, itself, attempt to identify the current user and then indicate such to the recommendation server. To illustrate, for example, if a husband and a wife often use the same device to download music, but at the current time, a web browser application is executing to access the official website of the World Wrestling Entertainment (www.wwe.com), the user's device (or the recommendation server) may guess that it is the husband who is access the recommendation service.

Upon receipt of the identifying information, the recommendation server, and, in particular, means, such as a processor and, in one embodiment, the determining module, may determine whether or not to include a reference to the media file in the user's profile. In particular, according to one embodiment, the recommendation server (e.g., means, such as a processor and, in one embodiment, the determining module) may first determine, at Block 405, whether the media file satisfies one of the rules defined by the user (or automatically generated by the recommendation server, for example, in the manner described below with regard to FIG. 4B). As discussed above, this may include comparing the media file to the one or more rules to determine whether the value of a parameter associated with the media file is substantially the same as the value defined by respective rules. For example, if a rule is associated with movies directed by Quentin Tarantino, it may be determined whether the value of the parameter defining the director of the consumed media file is substantially the same as "Quentin Tarantino."

If the value of the parameter of the consumed media file is substantially the same as the defined value of the rule (e.g., if the movie was directed by Quentin Tarantino), the recommendation server (e.g., means, such as a processor and, in one embodiment, an action module stored in memory on the recommendation server) may, at Block 406, take the action defined by the rule with respect to the consumed media file. As noted above, the action may include, for example, deleting reference to the media file from the user's account and/or profile; including reference to the media file in a temporary account associated with the user; and/or including reference to the media file in a temporary account associated with another party.

According to one embodiment, transferring reference to the media file to a temporary folder associated with another party, instead of directly to the other party's profile, may enable the other party to accept or deny the media file before it is added to his or her profile; thus preventing someone from sending media files to another person's profile without permission.

If the consumed media file does not satisfy one of the rules, the process may continue to Block 407, where the recommendation server (e.g., means, such as a processor and, in one embodiment, the determining module) may determine whether the consumed media file differs substantially from the user's profile. In other words, the recommendation server may attempt to determine whether this particular media file seems out of character for the user and, therefore, was likely consumed by someone other than the user. For example, according to one embodiment, collaborative filtering methods may be used to calculate a prediction as to how likely it is that the user would like the consumed media file. For example in item-based collaborative filtering, a prediction on the consumed file i for the user could be obtained by computing a sum of the ratings given by the user on the files similar to the consumed item, weighted by the similarity. An example of this may be where the user's profile indicates that the user typically only downloads nature documentaries, and the consumed media file is Anime. This may indicate to the recommendation server that someone other than the user is consuming media files under the user's account. In one embodiment, the recommendation server may further take into consideration the context information received when making this determination. In other words, if for example, the consumed media file is only slightly different than the user's profile, and the context information indicates that the user is alone, the recommendation server may determine that the user, and not someone else, likely consumed the media file. Alternatively, if the consumed media file is fairly different and the context information indicates that several people are near the user, the recommendation server may determine that someone other than the user likely consumed the media file.

If it is determined that the consumed media file does not differ substantially from the user's profile, indicating that it was likely that the user consumed the media file, the recommendation server (e.g., means, such as a processor and, in one embodiment, the inclusion module) may, at Block 408, include a reference to the media file in the user's profile, such that the consumed media file may be factored in later when generating a recommendation for the user.

If, on the other hand, it is determined that the consumed media file does differ substantially from the user's profile, the recommendation server (e.g., means, such as a processor and, in one embodiment, a temporary module stored in memory on the recommendation server) may, at Block 409, transfer the reference to the consumed media file to a temporary folder associated with the user. By transferring the reference to the media file to a temporary folder, instead of automatically including the reference in the user's profile, embodiments of the present invention enable a user to screen (and filter) media files that may have been consumed by someone other than the user. As discussed in more detail below, if the user did in fact consume the media file, he or she may accept the media file causing it to be included in his or her user profile. If he or she did not, the user may decline the media file and reference to the media file will be removed without ever having corrupted or contaminated the user's profile and/or recommendations generated there from.

According to one embodiment, in addition to transferring the reference to the consumed media file to a temporary folder associated with the user where it is determined that the consumed media file differs substantially from the user's profile, the recommendation server (e.g., means, such as a processor and, in one embodiment, the temporary module) may determine, at Block 410, whether the consumed media file is similar to the profile associated with one of the user's friends. As an example, the item-based CF algorithm may be used to calculate a prediction for the consumed media file given the user's profile, and each of his or her friends' profiles, and checked whether the prediction for any of the friends is large enough. If so, the recommendation server (e.g., means, such as a processor and, in one embodiment, the temporary module) may, at Block 411, also transfer the reference to the consumed media file to a temporary folder associated with that friend. As above, the friend may thereafter review the consumed media file and decide whether or not to include it in his or her user profile.

Turning now to FIG. 4B, according to one embodiment, in order to verify the quality of the temporary folder (e.g., determine whether media files referenced in the temporary folder should, in fact, be in the temporary folder and not, for example, in the user's profile), the recommendation server (e.g., means, such as a processor and, in one embodiment, a recommendation module stored in memory on the recommendation server) may periodically recommend a media file based at least in part on the contents of the temporary folder. (Block 412). In one embodiment, the recommendation server may recommend the exact media file referenced in the temporary folder. Alternatively, or in addition, the recommendation server may recommend a media file that relates or is similar to one or more media files referenced in the temporary folder.

In response, the user may transmit, and the recommendation server (e.g., means, such as a processor and, in one embodiment, a rating module stored in memory on the recommendation server) may, at Block 413, receive, a rating of the recommendation. For example, the user may rate the recommendation as "high" or "low," using a scale of one to five, and/or the like. If it is determined, at Block 414, that the rating was relatively low, indicating that the user did not like the recommendation and, therefore, that the recommendation server likely properly added the consumed media file(s) to the temporary folder (rather than including them in the user's profile), the recommendation server (e.g., means, such as a processor and, in one embodiment, a rule generation module stored in memory on the recommendation server) may, at Block 415, generate a new rule that indicates that for all similar media files consumed in association with the user, a reference to the media file should be transferred to the temporary folder. Alternatively, the rule may indicate that the references to similar media files should be deleted altogether. According to one embodiment, the user may determine which of the foregoing actions should be included in the rules automatically generated by the recommendation server. In either event, the rules generated by the recommendation server may be used at Block 405 when determining whether the consumed media file satisfies any of the rules associated with the user.

If, on the other hand, the rating provided by the user is high, the recommendation server (e.g., means, such as a processor and, in one embodiment, the inclusion module) may, at Block 416, include either or both the recommended media file and/or the media file from which the recommended media file was generated (if not the same) in the user's profile. For example, if the temporary folder included a reference to the song "Like the Weather" by the 10,000 Maniacs, and, as a result, the recommendation server recommended the song "San Andreas Fault" by Natalie Merchant, and the user gave the recommendation a high rating, either or both songs may be added to the user's profile. Future recommendations made for the user may thereafter be based at least in part on the newly added media files. In another embodiment, the recommendation server may deduce a rating for a particular media file (and, therefore, what action to be taken) based at least in part on how the user handled the media file recommended. For example, if the user stops listening to a music track and skips to a new one, the recommendation server may deduce that the user at that time did not rate the skipped music track very highly. In this scenario, future recommendations may not be based on the recommended music track.

In addition to the foregoing, the user may also periodically access the temporary folder in order to identify any media files that should be added to his or her user profile. (Block 419). In particular, the user may determine, at Block 418, whether he or she would like to accept or decline each media file referenced in the temporary folder. If the user declines the media file, as above when the user gave a low rating to the recommended media file, the recommendation server (e.g., means, such as a processor and, in one embodiment, the rule generation module) may, at Block 419, generate a new rule that indicates that for all similar media files consumed in association with the user, a reference to the media file should be transferred to the temporary folder or deleted altogether, depending, for example, on the user's preference. As above, the rules generated by the recommendation server at Block 419 may be used at Block 405 when determining whether the consumed media file satisfies any of the rules associated with the user.

Finally, if the user accepts a media file referenced in the temporary folder, the recommendation server (e.g., means, such as a processor and, in one embodiment, the inclusion module) may, at Block 420, include a reference to the media file in the user's profile.

While the foregoing describes the recommendation server generating a recommendation and receiving a rating before the user accesses the temporary folder and accepts or denies media files referenced in the temporary folder, embodiments of the present invention are not limited to this particular order. As one of ordinary skill in the art will recognize in light of this disclosure, these and other steps described in association with FIG. 4 may be performed in any order and/or simultaneously without departing from the spirit and scope of embodiments of the present invention.

According to another embodiment of the invention, the process described above may similarly be used to facilitate the logging of music heard in a public place, such as a bar or discotheque, to the profiles of members of the audience. For example, consider a DJ playing at the discotheque. People may come up to the DJ and ask for songs. In many instances, the user that requests a particular song may want the song to be logged to his or her music profile. In one embodiment, the DJ may run a special version of the client application on his or her PC or phone, such that when a person comes to request a song, the requestor may communicate his service user ID to the client application running on the DJ's device, for example, using Bluetooth® communication, touching a Radio Frequency Identification (RFID) tag, or by sending a Short Message Service (SMS) message, and/or the like. When the DJ plays the requested song, a temporary rule may be created to forward the song to the profile of the user who requested for the song. This may help users to maintain their profiles also for songs heard in public situations.

Alternatively, according to one embodiment, users may send their user ID's to the DJ, and allow all songs played during the night to be logged to his or her profile. If a user has enabled the logging all feature, when a user enters a discotheque, an application running on the DJ's device may communicate with the user's mobile phone to retrieve the service user ID. In this embodiment, during the time when the user's device is within the discotheque, for example, so that the DJ's device is able to detect the presence of the device using, for example, Bluetooth®, all songs played by the DJ may be logged to the users' accounts. Alternatively, the DJ's device may send the information identifying the songs to the user's device, which may then itself update the user's music consumption profile. In either way the users may receive the music heard in different discotheques with suitable equipment logged to their profiles.

Embodiments of the invention may also be applicable in live concerts so that an application running on the concert organizer's device may collect the user ID's of the concert participants, and automatically log the list of songs played in the concert to the participants' accounts by creating temporary rules. In this embodiment, the concert listeners may conveniently get a list of the songs played during the concert, which may be quite useful as often there are songs played in a concert that a user does not know. An alternative to this functionality may be to use, for example, audio fingerprinting to record a short clip of each song played in the concert and search the song information using existing services. A more robust solution may be obtained if an application controlled by the organizers of the concert knows the list of songs and communicates this information to the user's music service accounts.

In addition, according to various embodiments of the present invention, the foregoing techniques may likewise be used by the user's device itself in order to provide a similar "recommendation service." For example, the user may define, and/or the user's device may automatically generate, one or more rules to be used by the electronic device when selecting media files to output when the user instructs the electronic device to randomly select media files to output (e.g., when the user places the device in "shuffle" mode).

Regarding the rules defined by the user, in addition to defining rules that identify a specific media types (e.g., all country music) and provide a particular action to be taken with respect to these media files (e.g., skip), as described above, the user may define an expiration date associated with the rule. For example, the user may indicate that the rule should expire 24 hours after creation, immediately upon powering down the electronic device, and/or the like.

Regarding the rules automatically generated by the user's device, according to one embodiment, these rules may be generated based at least in part on the perceived consumption habits of the current user. For example, the user's device may monitor the media files output, skipped, repeated, and/or the like, by the current user, use this information to anticipate the types of media files the current user likes (or dislikes), and then generate one or more rules accordingly. Like the user-defined rules, these automatically generated rules may likewise have an expiration date associated therewith, which may, for example, be defined by a user as a default setting.

According to one embodiment, when a user instructs the electronic device to randomly output media files, for example, by placing the device in "shuffle" mode, the electronic device may use the defined and/or automatically generated rules to select (or not select) the media files output.

To illustrate, for example, a husband and a wife may both use a particular electronic device (e.g., cellular telephone, personal digital assistant (PDA), laptop, etc.) to play music tracks or files. When the user is using the device, she may define a rule that says that for the next five hours, all rock songs should be skipped. The electronic device may also perceive that the wife tends to skip R&B songs and automatically generate a similar rule to skip all R&B songs. According to embodiments of the present invention, when the electronic device is placed in "shuffle" mode, the device may select songs from the user's saved collection that are neither rock nor R&B.

CONCLUSION

As described above and as will be appreciated by one skilled in the art, embodiments of the present invention may be configured as an apparatus and method. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (e.g., systems) and computer program products. It will be understood that each block of the block diagrams and flowchart illustrations, and combinations of blocks in the block diagrams and flowchart illustrations, respectively, may be implemented by various means including computer program instructions. These computer program instructions may be loaded onto a general purpose computer, special purpose computer, or other programmable data processing apparatus, such as processor 210 discussed above with reference to FIG. 2, or processor 308 discussed above with reference to FIG. 3 to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus (e.g., processor 210 of FIG. 2, or processor 308 of FIG. 3) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising:
a processor configured to:
receive information identifying a media file consumed;
calculate a first similarity measure between the media file and a first profile of an account associated with a first user, the first similarity measure represented as a cosine of an angle between a vector of the media file and a vector of the first profile, wherein the vector of the first profile is based on a set of at least one reference to an included media file for generating a recommendation of another media file to the first user;
include the reference to the media file in the first profile in response to determining that the first similarity measure meets a first rule;
in response to determining that the first similarity measure does not meet the first rule, calculate a second similarity measure between the media file and a second profile of the account associated with the first user, the second similarity measure represented as a cosine of an angle between the vector of the media file and a vector of the second profile, the vector of the second profile being based on a set of at least one reference to an included media file for generating a recommendation of another media file to a second user;
include the reference to the media file in a temporary folder associated with the second profile in response to determining that the second similarity measure meets a second rule; and
generate a recommendation of a media file based at least in part on one or more media files, references to which are included in the temporary folder associated with the second profile.

2. The apparatus of claim 1, wherein in order to receive information identifying a media file consumed, the processor is further configured to receive information identifying a media file consumed via an electronic device associated with the first user.

3. The apparatus of claim 2, wherein in order to receive information identifying a media file consumed via the electronic device, the processor is further configured to receive information identifying a media file downloaded, purchased, or output via the electronic device.

4. The apparatus of claim 1, wherein the processor is further configured to:
receive the first rule as an input from the first user.

5. The apparatus of claim 1, wherein the processor is further configured to:
automatically generate at least one of the first rule and the second rule.

6. The apparatus of claim 1, wherein one or more parameters are associated with the vector of the media file, and wherein respective rules define a value of at least one of the one or more parameters and an action to be taken with respect to the media file if a value of the at least one parameter associated with the media file is substantially the same as the value defined by the rule.

7. The apparatus of claim 1, wherein the processor is further configured to:
receive an indication of whether to accept or decline a media file, reference to which is included in the temporary folder associated with the second profile; and
automatically generate at least one of the one or more rules associated with the second profile based at least in part on the received indication of whether to accept or decline the media file.

8. The apparatus of claim 1, wherein in order to determine whether a reference to the media file should be included in the first profile, the processor is further configured to:
identify one or more preferences associated with the first profile based at least in part on one or more media files, references to which are included in the first profile; and
compare the media file to the one or more preferences.

9. The apparatus of claim 1, wherein in order to receive information identifying a media file consumed, the processor is further configured to receive information identifying a media file consumed via an electronic device not associated with the first user, said processor further configured to:

receive a user identification associated with the first user, wherein the processor determines that the reference to the media file should be included in the first user's profile in response to receiving the user identification.

10. A method comprising:

receiving information identifying a media file consumed;

calculating a first similarity measure between the media file and a first profile of an account associated with a first user, the first similarity measure represented as a cosine of an angle between a vector of the media file and a vector of the first profile, wherein the vector of the first profile is based on a set of at least one reference to an included media file for generating a recommendation of another media file to the first user;

including the reference to the media file in the first profile in response to determining that the first similarity measure meets a first rule;

in response to determining that the first similarity measure does not meet the first rule, calculating a second similarity measure between the media file and a second profile of the account associated with the first user, the second similarity measure represented as a cosine of an angle between the vector of the media file and a vector of the second profile, the vector of the second profile being based on a set of at least one reference to an included media file for generating a recommendation of another media file to a second user;

including the reference to the media file in a temporary folder associated with the second profile in response to determining that the second similarity measure meets a second rule, the vector of the media file is similar to the vector of the second profile; and generating a recommendation of a media file based at least in part on one or more media files, references to which are included in the temporary folder associated with the second profile.

11. The method of claim 10, wherein receiving information identifying a media file consumed further comprises:

receiving information identifying a media file downloaded, purchased, or output via an electronic device associated with the first user.

12. The method of claim 10 further comprising:

receiving the first rule as an input from the first user.

13. The method of claim 10 further comprising:

automatically generating at least one of the first rule and the second rule.

14. The method of claim 10, wherein determining whether a reference to the media file should be included in the first profile further comprises:

identifying one or more preferences associated with the first profile based at least in part on one or more media files, references to which are included in the first profile; and comparing the media file to the one or more preferences.

15. A computer program product comprising at least one non-transitory computer-readable storage medium having computer-readable program code portions store therein, the computer-readable program code portions comprising:

a first executable portion for receiving information identifying a media file consumed;

a second executable portion for calculating a first similarity measure between the media file and a first profile of an account associated with a first user, the first similarity measure represented as a cosine of an angle between a vector of the media file and a vector of the first profile, wherein the vector of the first profile is based on a set of at least one reference to an included media file for generating a recommendation of another media file to the first user;

a third executable portion for including the reference to the media file in the first profile if it is determined that the first similarity measure meets a first rule, the vector of the media file is similar to the vector of the first profile;

a fourth executable portion for, in response to determining that the first similarity measure does not meet the first rule, calculating a second similarity measure between the media file and a second profile of the account associated with the first user, the second similarity measure represented as a cosine of an angle between the vector of the media file and a vector of the second profile, the vector of the second profile being based on a set of at least one reference to an included media file for generating a recommendation of another media file to a second user;

a fifth executable portion for including the reference to the media file in a temporary folder associated with the second profile if it is determined that the second similarity measure meets a second rule, the vector of the media file is similar to the vector of the second profile; and a sixth executable portion for generating a recommendation of a media file based at least in part on one or more media files, references to which are included in the temporary folder associated with the second profile.

16. The computer program product of claim 15, wherein the computer-readable program code portions further comprise:

a seventh executable portion for receiving the first rule as an input from the first user.

17. The computer program product of claim 15, wherein the computer-readable program code portions further comprise:

a seventh executable portion for automatically generating at least one of the one or more rules associated with the first user.

18. The computer program product of claim 15, wherein the second executable portion is configured to:

identify one or more preferences associated with the first profile based at least in part on one or more media files, references to which are included in the first profile; and compare the media file to the one or more preferences.

* * * * *